United States Patent [19]

Casella

[11] Patent Number: 5,399,221

[45] Date of Patent: Mar. 21, 1995

[54] CONTINUOUS PROCESS FOR FORMING FIBER-REINFORCED HIGH TEMPERATURE THERMOPLASTIC RESIN HONEYCOMB STRUCTURES

[75] Inventor: Frank A. Casella, Alhambra, Calif.

[73] Assignee: Northrop Grumman Corporation, Los Angeles, Calif.

[21] Appl. No.: 519,044

[22] Filed: May 4, 1990

[51] Int. Cl.$^6$ .................... B32B 31/12; B32B 31/20
[52] U.S. Cl. .................. 156/274.4; 156/292; 156/380.2; 156/380.6; 156/469; 156/471; 428/118
[58] Field of Search ............ 428/118; 156/274.4, 156/380.2, 380.6, 292, 469–471

[56] References Cited

U.S. PATENT DOCUMENTS

| | | | |
|---|---|---|---|
| 3,356,555 | 12/1967 | Jackson | 156/205 |
| 4,385,957 | 5/1983 | Wackerle et al. | 156/273.9 |
| 4,957,577 | 9/1990 | Huebner | 156/197 |
| 5,139,596 | 8/1992 | Fell | 156/292 X |
| 5,217,556 | 6/1993 | Fell | 156/292 X |
| 5,252,163 | 10/1993 | Fell | 156/292 X |

FOREIGN PATENT DOCUMENTS

| | | | |
|---|---|---|---|
| 284848 | 10/1988 | European Pat. Off. | 428/118 |
| 312801 | 6/1929 | United Kingdom | 428/118 |
| 577790 | 5/1946 | United Kingdom | 156/292 |

OTHER PUBLICATIONS

PCT International Application, publication No. WO89/10258 by Fell, published Nov. 12, 1989.
PCT Internatiional Application, publication No. WO87/06186 by Ashton, published Oct. 22, 1987.

Primary Examiner—Michael Ball
Assistant Examiner—Adrienne C. Johnstone
Attorney, Agent, or Firm—Terry J. Anderson; Harl J. Hoch, Jr.

[57] ABSTRACT

A continuous process for producing honeycomb support structures by bonding a plurality of thermoplastic sheets together. The process comprises feeding, aligning, supporting and bonding thermoplastic corrugated sheets in sequence to build a honeycomb-structure of the desired dimensions. Bonding is accomplished by impulse heating through retractable support bars in cooperation with a movable heating/cooling platen, pairs of sheets to be bonded being indexed therebetween, in sequence, to bond one sheet at a time to form the multi-sheet structure.

3 Claims, 2 Drawing Sheets

CONTINUOUS PROCESS FOR FORMING FIBER-REINFORCED HIGH TEMPERATURE THERMOPLASTIC RESIN HONEYCOMB STRUCTURES

FIELD OF THE INVENTION

This invention relates to a continuous process for forming composite structures as used in aircraft, and more particularly to a continuous manufacturing process for processing thermoplastic preimpregnated fiber material into honeycomb ducted core structures capable of sustained service at high temperature.

BACKGROUND OF THE INVENTION

Composite structures in aircraft typically utilize a tough skin surface supported by a lightweight core material. Development efforts to increase the strength/weight ratio of the core have resulted in cellular plastic structures such as rigid expanded foam of random cell pattern. Superior structural properties have been realized in cores formed in a geometric honeycomb pattern of hexagonal ducts, achieving very light weight due to the high percentage of air volume: 90% to 98%. Such a core, when sandwiched between two skins, forms a directional structure possessing a uniform crushing strength under compression.

In known art, such cellular or ducted cores are commonly made from thermosetting resins, which are plastics which solidify when first heated under pressure, and which cannot be remelted or remolded, as opposed to thermoplastic resins, which are materials with linear macromolecular structure that will repeatedly soften when heated and harden when cooled.

As utilization of such structures is expanded to include areas previously avoided due to structural demands and temperature, vibration and impact loading environments, new composite matrices are required. Thermosetting resins, commonly used, in most cases, lack the toughness and stability needed for these applications.

New thermoplastic materials offer improved properties; for example composite skin-surfaced structures having honeycomb cores made from thermoplastic preimpregnated fiber material provide excellent impact strength and damage tolerance. However, by their nature, the new thermoplastic materials require new and unconventional processing methods. As opposed to conventional thermosetting processes where sticky and viscous fluids are saturated into reinforcing fiber forms to be cured by catalysts and heat, thermoplastics which have no cure cycle are hard and "boardy" initially, and have to be melted at high temperatures to be worked to the desired shapes. Thus completely different processing schemes are required for thermoplastics than those that have been developed for thermosets. This also holds true for the honeycomb core which is used to give light composite aircraft parts large moments of inertia to multiply stiffness and strength without proportional increases in weight.

In known art, thermoset honeycomb material is made by a process that takes advantage of the flexibility of the reinforcing fabric before it is impregnated with resin. It is bonded and then expanded into hexagon honeycomb structure while it is soft, then wash coated with resin which is subsequently cured to give it its stiffness.

In contrast, thermoplastics, utilized in the present invention for their superior ultimate properties, have no soft stage, and they are too viscous to be wash coated or by some other means saturated into the fabric after bonding the sheets together. The practical options for bonding thermoplastic fiber material are limited by the high degree of stiffness of thermoplastic resin impregnated fiber reinforcement. Therefore, pre-forming of the thermoplastic fiber reinforced material into a ducted honeycomb structural pattern has been selected as the method for producing strong lightweight core material in the present invention, which addresses new processing methods for realizing the full benefits of the superior ultimate properties of such structure.

Thermoplastic preimpregnated fiber material is available both in ribbon (continuous woven fabric sheet) and yarn form.

The first step in processing thermoplastic preimpregnated fiber material into ducted core structures is to preform the thermoplastic material, typically in sheets which can be stacked and thermal fusion bonded in the desired duct pattern.

Thermal fusion bonding processes for this type of core may be divided into two main classifications:
(a) block processing where an entire honeycomb block is bonded in a single bonding cycle, and
(b) layer processing where each sheet is bonded to the previously added sheet in a separate bonding cycle for each sheet as a stack is thus built up progressively.

In a basic block process, thermoplastic preimpregnated material is preformed into duct (or half-duct) patterned sheets which are stacked into a press, along with interspersed rows of duct forming mandrels in a honeycomb pattern. With a full stack under compression, heat is applied to fusion bond all the sheets in the stack together at their interfacial facets. Then after cooling to a setting temperature, pressure is released and the mandrels are extracted, leaving a completed honeycomb block of ducted core material.

This basic block bonding process, while viable for smaller sized workpieces and developmental purposes, poses certain difficulties and limitations, which have been addressed by the present invention:

(1) the cycle time is long due to the labor required to prepare, stack and remove the mandrels: for 3/16" (4.76 mm) hex ducts, 1100 mandrels are required for a cube core of 6" (15.24 cm) per side;
(2) the preformed corrugated sheets have an inherent curvature and springiness which make the stacking process difficult and slow;
(3) removing the mandrels from the bonded honeycomb block presents major difficulties, requiring a special long stroke pneumatic press with a supported long thin pin to push them out individually, a slow, skill-intensive and risky process since the mandrels tend to become partially bonded in place despite the use of release agents, and any mushrooming of the mandrel ends by the press pin is likely to damage the honeycomb duct structure;
(4) heat penetration throughout the block is slow and must be carefully monitored with multiple embedded thermocouples to ensure complete bonding in all regions of the block; and
(5) practically all of the aforementioned difficulties become sharply aggravated when it is attempted to increase the size of the workpiece, thus there are unacceptable limits on producible block size.

As an alternative to the block bonding process, a layer bonding process which bonds only one layer at a time offers a number of advantages such as greatly reducing the number of mandrels required, facilitating uniform bonding, and enabling production of much larger sized blocks. However certain new and different difficulties must be overcome in layer bonding.

The present invention addresses solutions to these and other problems and difficulties in seeking improved processes and apparatus for the continuous processing of thermoplastic preimpregnated fiber material into larger sized structures of ducted core material, as reflected in the following objects and summary of the invention.

OBJECTS AND SUMMARY OF THE INVENTION

A primary object of this invention is to provide a continuous method of processing thermoplastic pre-impregnated fiber composite corrugated sheets to efficiently produce a ducted core material, preferably in a hexagonal honeycomb pattern, that can be used at sustained high service temperatures without substantial loss of strength or degradation of mechanical properties.

Further to the primary object it is an object to enable production of structures of the ducted core material of substantially larger size, well beyond the limitations of known processing art.

Another object is to provide a continuous layer bonding process enabling sheets of thermoplastic pre-impregnated preformed corrugated fibercloth to be thermal fusion bonded one sheet at a time onto a progressively built up stack so as to thus produce a block structure of ducted core material.

A further object is to implement a continuous layer bonding process with two sets of forming mandrels or heating rods, which may be secured at opposite ends of a mechanically operable attachment block by which the heating rods may be inserted and withdrawn from opposite edges of a stack during each layer bonding cycle, shifted and reinserted mechanically ready for a subsequent layer bonding cycle, thereby providing more uniform support during bonding.

A still further object is to provide means for compressing together and heating each interfacial facet area or contacting peak area between a most recently added corrugated sheet and the previously added corrugated sheet in a stack being built up, sufficient for thermal fusion bonding, without transmitting harmful temperatures or pressure to any unsupported honeycomb ducts.

The present invention relates to a continuous process for producing a honeycomb structure from a plurality of similar corrugated elongate composite sheets of thermoplastic composition, each said sheet having a plurality of uniformly-spaced transverse corrugations across its width which have peak surfaces such as co-planar flat facet areas at the upper and lower surfaces thereof, comprising the steps of:

(a) supporting at least one assembly of extended narrow, elongate, uniformly spaced, mandrels or induction heating rods for simultaneous retractable movement along a horizontal plane, the rods being dimensioned and spaced to extend between adjacent corrugations on the lower surface of the bottom corrugated sheet being bonded and substantially throughout the length of the corrugations;

(b) inserting a first corrugated sheet in horizontal position over the extended heating rods so that adjacent heating rods nest between adjacent corrugations on the lower surface to support the first sheet substantially across its width;

(c) inserting a second corrugated sheet in aligned horizontal position over said first sheet so that the peaks or planar facets of the corrugations on the lower surface of the second sheet are aligned for overall surface contact with the peaks or planar facets of the corrugations on the upper surface of the first sheet;

(d) lowering a heating/cooling platen against the upper surface of the second sheet, the platen comprising a plurality of narrow, elongate, uniformly spaced heating/cooling contact surfaces or ridges which are dimensioned and spaced to extend between adjacent corrugations on the upper surface of the second sheet, substantially throughout the length thereof, to press the contacting co-planar facets or peaks of the corrugations of the second and first sheets between a said ridge and an induction heating rod;

(e) inducing an impulse current through the induction heating rods, contacting facets or peaks and platen ridges sufficient to heat-fuse the first and second thermoplastic sheets to each other in the areas of the contacting facets or peaks;

(f) cooling the platen ridges to reduce the temperature of the heat-fused peak areas, and (g) retracting the induction heating rods to provide a honeycomb structure of the corrugated sheets, the peak or facet areas of which are fused to each other to form therebetween adjacent elongate honeycomb ducts or passages comprising the spaces between the peak surfaces on the lower surface of the first sheet and on the upper surface of the second sheet.

Generally, the present continuous process is used for the bonding of a multiplicity of similar corrugated sheets to produce a large honeycomb structure, in which each additional corrugated sheet is inserted in aligned horizontal position over the previously-bonded top corrugated sheet so that the co-planar facets or peaks of the corrugations on the lower surface of each additional sheet, in sequence, are aligned in surface contact with the facets or peaks of the corrugations on the upper surface of the previously-bonded top sheet; the plurality of induction heating rods is extended automatically into the adjacent elongate honeycomb ducts or passages formed between the previously-bonded pair of corrugated sheets so that adjacent heating rods nest between corrugations on the lower surface of the previously-bonded top sheet to support the top sheet substantially across its width; the heating/cooling platen is automatically lowered against the upper surface of the additional sheet so that said heating/cooling ridges extend between adjacent corrugations on the upper surface of said additional sheet, substantially throughout the length thereof, to press the contacting facets or peaks of the corrugations of the additional sheet and previously-bonded top sheet between a ridge and an induction heating rod; an impulse current is automatically induced in the induction heating rods, facets, and platen sufficient to heat-fuse the additional and top thermoplastic sheets to each other in the areas of the contacting facets or peaks; the platen ridges are cooled automatically and the induction heating rods are retracted automatically to form a multi-sheet honeycomb structure in which each additional corrugated sheet is peak-bonded, in sequence, to an adjacent corrugated sheet to form a plurality of elongate honeycomb passages therebetween.

The present continuous process, according to preferred embodiments, comprises supporting the first corrugated sheet on an adjustable horizontal support surface which is automatically lowerable in increments equal to the overall thickness of each sheet i.e., the distance between the planes of the peaks on opposite sides of the sheet, and adjustably supporting each assembly of induction heating rods for automatic zig zag shifting between two support positions for extension and retraction of the rods along first and second parallel horizontal paths on the same plane, which paths are spaced from each other by a distance equal to the space between corrugations on each of the corrugated sheets being bonded. After the completion of bonding of a second sheet to the first sheet, the horizontal support surface is automatically lowered by an increment after the automatic retraction of the heating rods along the first path and the assembly of induction heating rods is automatically shifted from the first support position into position for movement along the second path, to extend the assembly and insert the heating rods into the adjacent elongate honeycomb passages formed between the previously bonded corrugated sheets. This procedure is repeated after each bonding cycle to permit additional sheets, in sequence, to be moved into fixed bonding position automatically along a fixed horizontal plane even though the height of the honeycomb structure increases with each additional corrugated sheet bonded thereto.

The principle of continuous thermal fusion layer bonding of a plurality of sheet materials is embodied in accordance with this invention by the use of a machine which provides uniform interface pressure and heat, and mechanized shifting and manipulation of the heating rods and the corrugated sheets to produce honeycomb ducted core material under automatic control, and a floating table supporting the sheet materials during processing.

DETAILED DESCRIPTION

Figure 1:
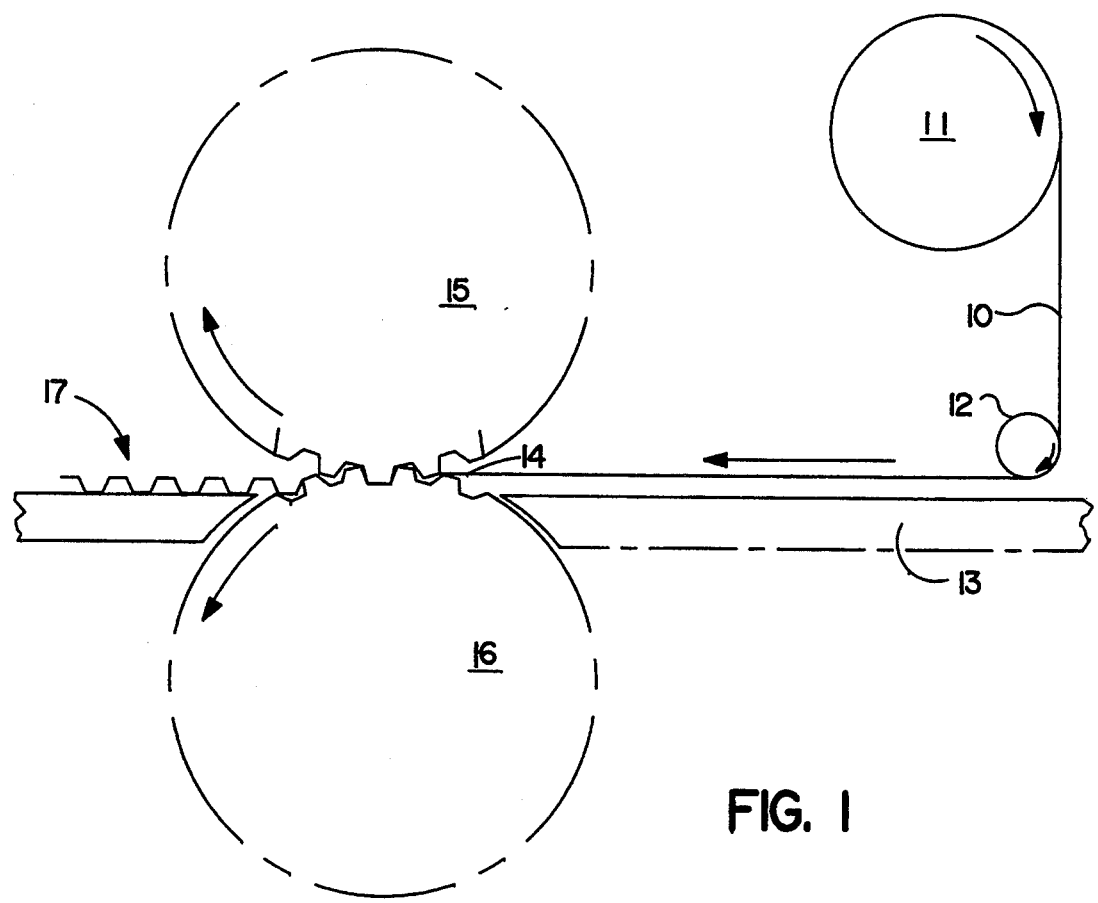
FIG. 1 is a schematic representation of a heated/cooled roller press in the process of corrugating a thermoplastic fiber reinforced composite sheet used in accordance with the present invention.

FIG. 1 illustrates a continuous thermoplastic preimpregnated fabric web 10 being dispensed from a supply roll 11, over a guide roll 12 and into proximity with a heated platen 13 in advance of the corrugation position. The web 10 preferably comprises a fiberglass fabric coated with an aqueous dispersion of a powdered high temperature thermoplastic resin such as a polyaryl ether, and the platen 13 is heated to a temperature sufficiently high to melt the resin powder, i.e., 500°–725° F.

The heated web 14 is then corrugated by drawing it between a pair of rotating spring-pressurized toothed metal rollers 15 and 16, the temperature of which may be regulated by circulating, heating or cooling fluid therethrough, depending upon the requirements of the particular composite materials being used.

The corrugated web 17 retains its corrugated molded shape and represents a continuous supply of corrugated hemi-honeycomb sheet material which can be cut into desired sheet lengths and immediately united with each other in predetermined orientation to form honeycomb blocks or structures of desired dimensions according to the present process or can be stored for subsequent use.

Figure 2:
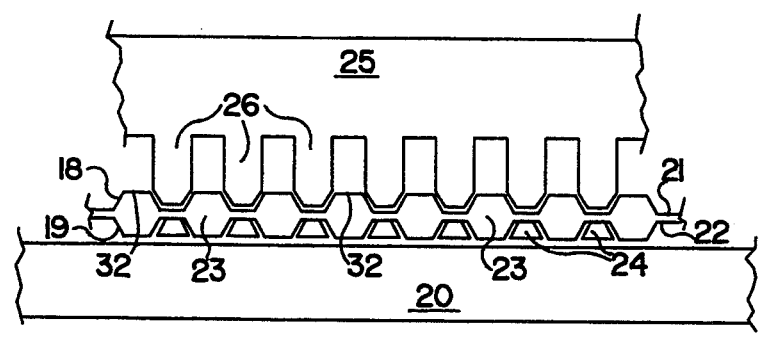
FIG. 2 is an end or edge view illustrating the thermal bonding of two composite hemi-honeycomb sheets to each other at spaced interfacial facets to form a honeycomb unit, as one step in the continuous process of producing multi-unit honeycomb structures.

The first step in the present continuous assembly process is illustrated by FIG. 2 of the drawings. Thus sheet length 19 of corrugated thermoplastic fabric composite, such as cut from continuous web 17 of FIG. 2, is fed onto the extended elongate heating rods 24 over support table 20, and then sheet 18 is fed into superposition thereover on the support table 20, top sheet 18 being positioned one corrugation relative to sheet 19, out of nesting position, so that the repeating planar facets 21 and 22 of sheets 18 and 19 are in contact with or are facing each other and elongate honeycomb passages 23 are present therebetween, as shown in FIG. 2.

Fusion bonding of the sheets 18 and 19 to each other at each of the facet areas is accomplished by automatically pre-inserting a retractable assembly comprising a spaced plurality of elongate induction heating rods 24 and positioning the bottom corrugated sheet 19 thereover so that an elongate heating rod 24 is positioned within each of the elongate hemi-honeycomb spaces beneath each of the facets 22 of the lower sheet 19, indexing the upper corrugated sheet 18 over sheet 19, and automatically lowering an induction heating/cooling platen 25 having a plurality of spaced elongate contact members 26 so that the lower faces of the latter engage the facets 21 of the top sheet 18 and press the facets 21 and 22 together. An impulse current of electricity is then induced through the lower heating rods 24, the contacting facets 21 and 22, and the mating ridges or contact members 26 of the platen 25. This produces a softening and fusion of all of the facets 21 and 22 to each other to form strong elongate bonds 31 between the sheets 18 and 19 along the length of the facet surfaces adjacent the elongate honeycomb spaces 23.

The automatic impulse current is sufficient to produce a momentary temperature sufficient to fuse the corrugated sheets together in the areas 31 of the contacting facets 21 and 22, after which the temperature is rapidly reduced by automatic cooling of the platen 25 to set the bonded areas 31 and prevent heat distortion of adjacent areas of the sheets 18 and 19. After cooling, the rods 24 are automatically retracted, the heating/cooling platen 25 is raised and the floating table 20 is lowered a distance equal to the thickness of each corrugated sheet, i.e., the depth of each corrugation or hemi-honeycomb, the assembly of rods 24 and the heating/cooling platen 25 are automatically indexed or shifted to the left or right by a distance equal to the width of the formed elongate honeycomb passages 23, and the rods are re-extended so that each one extends into one of the preformed passages 23, into contact with the undersurface of a planar facet 32 of sheet 18.

Figure 3:
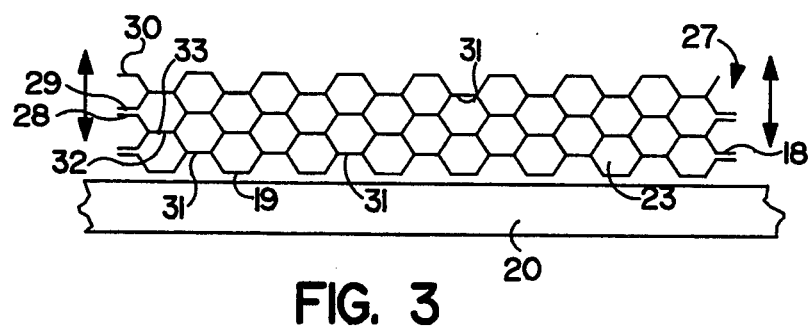
FIG. 3 is an end or edge view of a multi-unit honeycomb structure as produced according to FIG. 2.

This procedure is repeated continuously with additional hemi-honeycomb sheets to build up a honeycomb structure 27, shown in FIG. 3, having the desired number of composite sheets. Thus, FIG. 3 illustrates five bonded composite sheets 18, 19, 28, 29 and 30. Sheets 18 and 19 are bonded at facet areas 31, as discussed above. Then identical sheet 28 is indexed into facet-contact position over sheet 18 after the floating table 20 is lowered and after the spaced heating rods 24 are shifted horizontally.

The heating/cooling platen 25 is again lowered against the uppermost composite sheet, i.e., sheet 28, so that the faces of the ridges or contact members 26 engage the facets 33 of sheet 28 and press them against the facets 32 of sheet 18. Impulse current is again induced through the rods 24, facets 32 and 33 and contact members 26 to unite sheet 28 to the preformed unit of sheets 18 and 19 by fusing facets 32 and 33, after which the platen 25 is cooled and raised and the rods 24 are retracted.

As will be clear to those skilled in the art, the foregoing procedure is repeated in continuous manner, each additional composite corrugated sheet, such as 28, 29 and 30, being indexed into position over each previously-bonded sheet, such as 18, so that the lower planar facets thereof engage or face the upper planar facets of the previously-bonded sheet to form enclosed honeycomb spaces, such as 23, in adjacent areas between contacting facets. For each bonding step the supporting table 20 is lowered an increment and the heating rods 24 and platen 25 are shifted or indexed horizontally in zig-zag fashion to position them for insertion and lowering (respectively) into the elongate enclosed honeycomb spaces previously formed in the prior bonding step. Each new corrugated sheet, such as 28, 29 and 30, is facet-bonded to the underlying sheet in the foregoing manner to produce a final honeycomb structure 27 as illustrated by FIG. 3.

Figure 4:
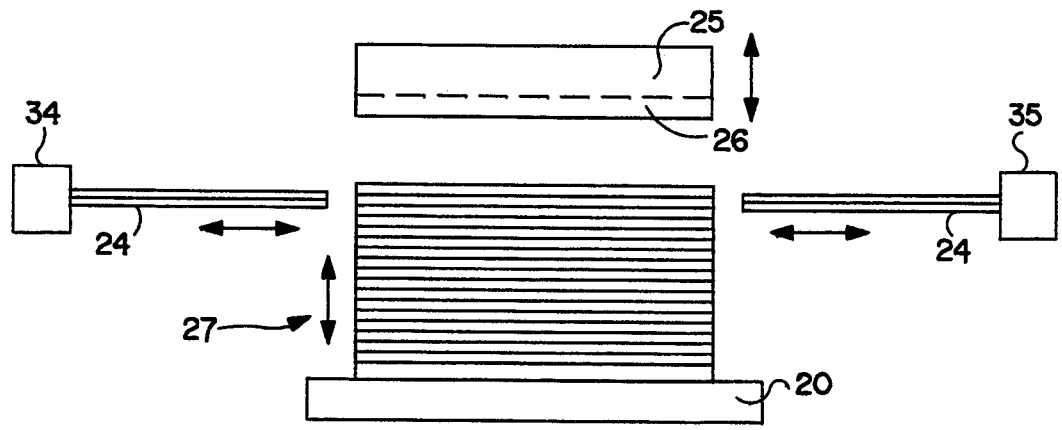
FIG. 4 is a schematic representation of an apparatus used to carry out the continuous process of the present invention.

The schematic representation of FIG. 4 illustrates a preferred embodiment of the present apparatus in which the heating/cooling platen 25, the induction rods 24 and the floating table 20 are supported by a common frame or support structure. The platen 25 is supported in raised position a predetermined distance above the horizontal plane of the rods 24. The rods 24 comprise segments or half-rods supported at fixed elevation by blocks 34 and 35 at opposite sides of the apparatus for retractable horizontal movement of the rods 24 along the same horizontal axes, from opposite directions, into the elongate honeycomb spaces 23 between the uppermost bonded corrugated sheet and the new sheet thereover, to which it is to be bonded thereto.

The opposed segmented rods 24 enter the same honeycomb spaces 23 from opposite ends thereof and meet in the center to produce substantially continuous fusion of the facets being bonded. The shorter rods 24, supported by their retractable blocks 34 and 35 at each side of the apparatus, provide a stronger support against the slight downward pressure of the platen 25, particularly in cases where the honeycomb structure 27 is relatively wide.

The floating table 20 is adjustably attached to the frame of the apparatus for automatic incremental indexing downwardly to permit new corrugated sheets to be inserted into bonding position at the top of the heat-bonded core 27, fixed relative to the horizontal insertion plane of the rods 24 and the lower or compression position of the heating/cooling platen 25.

Figure 5:
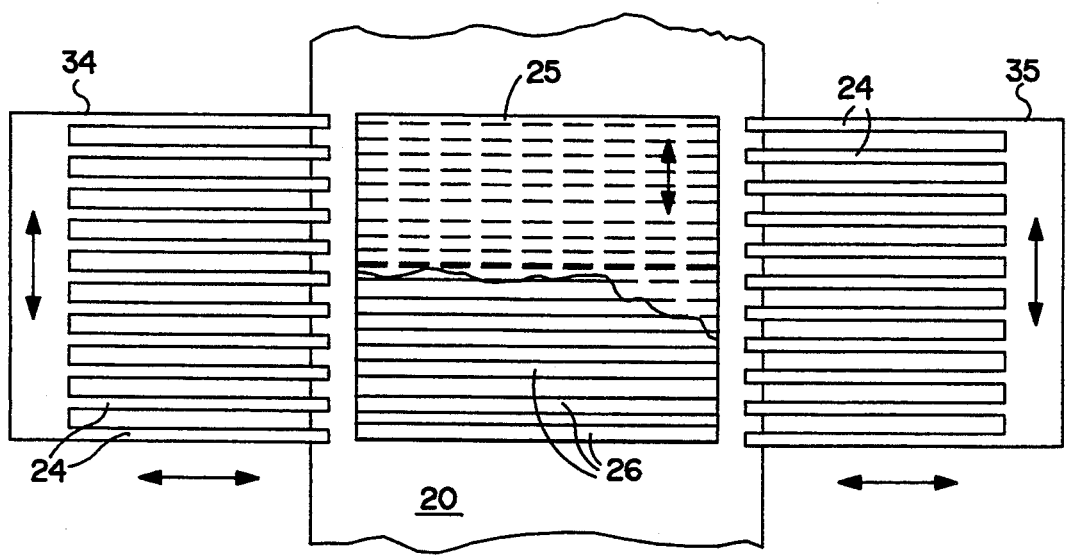
FIG. 5 is a sectional top view of the apparatus of FIG. 4.

FIG. 5 illustrates the retractable blocks 34 and 35 supporting the induction heating rods 24, and also the heating/cooling platen 25 which is sectioned to illustrate the spaced contact members 26. As shown, the spaced elongate rods 24 are aligned for positioning beneath the similarly-spaced elongate contact members for the heat-compression therebetween of contacting facets of sheets being bonded to each other.

Preferably the surfaces of the heat induction rods 24 and of the platen contact members 26 are provided with stick-resisting coatings and/or release agents in order to prevent them from adhering to the bonded facets of the corrugated sheets during the present assembly process. Also the leading ends of the rods 24 preferably are rounded slightly to facilitate automatic entry into the elongate honeycomb spaces to carry out the bonding process.

The formed structures 27 of bonded honeycomb core material may be machined or sawed into cross slices of desired thickness as finished core material ready for final use.

Particular parameters of the process depend on the type of material used, the honeycomb pattern size and the size of block to be produced. For a hexagon duct width of 3/16" (0.1875', 4.76 mm) the roller tooth configuration in FIG. 1 is made 0.109" (2.769 mm) at the plateau forming the lower corrugations and 0.120" (3.048 mm) at the valley floor forming the upper corrugations at a depth of 0.094 (2.388 mm), for material having a typical thickness of 0.01" (0.254 mm). Cooling and setting of corrugated material 17 of FIG. 1 may be expedited by directing cool air from a row of jets onto its surface as it exits the roller interface.

Regarding heat for facet bonding or fusion, since the thermoplastic composition does not actually cure it does not need to remain at the bonding temperature for any length of time. Furthermore, it is advantageous to heat up and cool off the facet areas as rapidly as possible to prevent transfer of excessive amounts of heat.

The above described method and apparatus of a particular illustrative embodiment discloses the best mode known for practicing the invention to produce core material in continuous manner. The modification of certain parameters such as physical dimensions, platen force, temperatures and timing of the processes taught by this invention, in order to optimally accommodate different sized work pieces and/or alternative equivalent materials, are within the regular scope and competence of those skilled in the arts of plastic processing.

It will be apparent to those skilled in the art that the present process is applicable to the continuous assembly of corrugated sheets of thermoplastic composition of various types, the most important of which are heat-resistant composite materials comprising a woven or non-woven base web and a thermoplastic resin layer which is coated or formed thereon or therein or is laminated thereto so as to integrate the fabric therewith. Obviously the bonding conditions of temperature and pressure must be selected to soften and integrate the corrugated films in the facet areas without disrupting the integrity or shape of the corrugated films.

The particular hex duct honeycomb pattern shown herein, formed from hemi-honeycomb sheets in which the corrugations have inwardly-tapered side walls and a flat top wall which is co-planar on both sides of the sheet, is preferred but should not be considered as restrictive. The processes of this invention are generally applicable to forming ducted core structures of various matrix patterns of which the honeycomb is representative and for which the term "honeycomb" is used in a generic sense herein and in the appended claims.

The invention may be embodied in other specific forms without departing from the spirit and essential characteristics thereof, The present embodiments are therefore to be considered in all respects as illustrative and not restrictive, the scope of the invention being indicated by the appended claims rather than by the foregoing description; and all variations, substitutions and changes which come within the meaning and range of equivalency of the claims are therefore intended to be embraced therein,

I claim:

1. A continuous process for producing a honeycomb structure from a plurality of similar corrugated elongate sheets of thermoplastic composition, each said sheet having a plurality of uniformly-spaced transverse corrugations having peak surfaces at the upper and lower surfaces thereof, comprising the steps of:

supporting at least one assembly comprising a plurality of extended narrow, elongate, uniformly spaced, induction heating rods extending in a horizontal plane and adapted for extendable and retractable movement in said horizontal plane, said heating rods being dimensioned and spaced to extend within elongate hemi-honeycomb spaces of adjacent corrugations of each said corrugated sheet which have peak surfaces at the upper surface of each said corrugated sheet and substantially throughout the length of said corrugations;

inserting a first of said corrugated sheets in horizontal position over said heating rods, said peak surfaces at the upper surface of said first sheet resting upon said heating rods to support said first sheet substantially across its width;

inserting a second of said corrugated sheets in aligned horizontal position over said first sheet, peak surfaces at the lower surface of said second sheet being aligned with and resting in surface contact upon said peak surfaces at the upper surface of said first sheet;

lowering an induction heating/cooling platen into contact with said second sheet, said platen comprising a plurality of narrow, elongate, uniformly spaced heating/cooling ridges which are dimensioned and spaced to extend between adjacent corrugations of said second sheet which have peak surfaces at the upper surface of said second sheet, substantially throughout the length thereof, said platen ridges pressing each pair of contacting peak surfaces of said first and second sheets together between an associated platen ridge and an associated heating rod, said platen being adapted and controlled for cooling of said platen ridges;

inducing an impulse current through said heating rods, contacting peak surfaces and platen ridges sufficient to heat-fuse said first and second sheets to each other in the areas of said contacting peak surfaces;

cooling said platen ridges to rapidly reduce the temperature of the heat-fused peak surfaces, said cooling preventing heat distortion of said fused first and second sheets;

retracting said heating rods, said first and second sheets being fused to each other to form therebetween adjacent elongate honeycomb passages defined by said corrugations having peak surfaces at the lower surface of said first sheet and at the upper surface of said second sheet;

raising said platen for horizontal insertion of a first additional corrugated sheet;

lowering said fused first and second sheets for horizontal insertion of said first additional corrugated sheet;

inserting said first additional corrugated sheet in aligned horizontal position over said fused first and second sheets, peak surfaces of the corrugations of said first additional corrugated sheet at the lower surface of said first additional corrugated sheet being aligned and in surface contact with peak surfaces of the corrugations at the upper surface of said second sheet;

shifting said heating rods in a lateral direction in said horizontal plane by a distance equal to the uniform spacing between said transverse corrugations, said shifted heating rods being positioned and aligned for extension into said elongate hemi-honeycomb spaces of said second sheet;

shifting said platen laterally in said direction by said distance, said platen ridges of said shifted platen being positioned and aligned for extension between adjacent corrugations of said first additional corrugated sheet which have peak surfaces at the lower surface of said first additional corrugated sheet;

extending said plurality of heating rods into said elongate hemi-honeycomb spaces of said second sheet, peak surfaces of said second sheet at the upper surface of said second sheet resting upon said shifted heating rods, said shifted heating rods supporting said fused first and second sheets and said first additional corrugated sheet substantially across their width;

lowering said platen into contact with said first additional corrugated sheet, said platen ridges extending between adjacent corrugations of said first additional corrugated sheet which have peak surfaces at the upper surface of said first additional corrugated sheet, substantially throughout the length thereof, said shifted platen ridges pressing each pair of contacting peak surfaces of said first additional corrugated sheet and said second sheet together between an associated shifted platen ridge and an associated shifted heating rod;

inducing an impulse current through said heating rods, contacting peak surfaces and platen sufficient to heat-fuse said first additional corrugated sheet and said second sheet to each other in the areas of said contacting peak surfaces;

cooling said platen ridges to rapidly reduce the temperature of the heat-fused peak surfaces, said cooling preventing heat distortion of said fused first and second sheets and said first additional corrugated sheet;

retracting said heating rods to provide said honeycomb structure comprising said fused first and second sheets and said first additional corrugated sheet and having a plurality of elongate honeycomb passages extending therethrough; and, repeating said raising, lowering, inserting, shifting, extending, lowering, inducing, cooling, and retracting steps for each additional corrugated sheet to be bonded to form said honeycomb structure having a desired stack height and in which each corrugated sheet is peak-bonded to an adjacent corrugated sheet to form a plurality of elongate honeycomb passages therebetween, said shifting direction being reversed as each additional corrugated sheet is successively bonded to said honeycomb structure, said heating rods and said platen being shifted in reciprocating fashion.

2. A continuous process according to claim 1 further comprising:

supporting said first sheet on an adjustable horizontal support surface which is lowerable in increments equal to a thickness of said corrugated sheets; and, lowering said horizontal support surface by one said increment after each retraction of said heating rods.

3. A continuous process for producing a honeycomb structure from a plurality of similar corrugated elongate sheets of thermoplastic composition, each said sheet having a plurality of uniformly-spaced transverse corrugations having peak surfaces at the upper and lower surfaces thereof, comprising the steps of:

supporting two assemblies each comprising a plurality of extended narrow, elongate, uniformly spaced induction heating rods extending in a common horizontal plane, one assembly being supported at each opposing side of said honeycomb structure, said heating rods being adapted for aligned extendable movement of said heating rods of both assemblies in said horizontal plane from opposite directions into substantially-contacting extended position, said heating rods being further adapted for aligned retractable movement in said horizontal plane, said heating rods being dimensioned and spaced to extend within elongate hemi-honeycomb spaces of adjacent corrugations of each said corrugated sheet which have peak surfaces at the upper surface of each said corrugated sheet and substantially throughout the length of said corrugations;

inserting a first of said corrugated sheets in horizontal position over said extended heating rods, said peak surfaces at the upper surface of said first sheet resting upon said heating rods, said extended heating rods of said assemblies supporting said first sheet from both edges thereof;

inserting a second of said corrugated sheets in aligned horizontal position over said first sheet, peak surfaces at the lower surface of said second sheet being aligned with and resting in surface contact upon said peak surfaces at the upper surface of said first sheet;

lowering an induction heating/cooling platen into contact with said second sheet, said platen comprising a plurality of narrow, elongate, uniformly spaced heating/cooling ridges which are dimensioned and spaced to extend between adjacent corrugations of said second sheet which have peak surfaces at the upper surface of said second sheet, substantially throughout the length thereof, said platen ridges pressing each pair of contacting peak surfaces of said first and second sheets together between an associated platen ridge and an associated pair of substantially-contacting extended heating rods, said platen being adapted and controlled for cooling of said platen ridges;

inducing an impulse current through said heating rods, contacting peak surfaces and platen ridges sufficient to heat-fuse said first and second sheets to each other in the areas of said contacting peak surfaces;

cooling said platen ridges to rapidly reduce the temperature of the heat-fused peak surfaces, said cooling preventing heat distortion of said honeycomb structure; and, retracting said heating rods to provide said honeycomb structure comprising said first and second sheets fused to each other to form therebetween adjacent elongate honeycomb passages defined by said corrugations having peak surfaces at the lower surface of said first sheet and at the upper surface of said second sheet.

* * * * *